United States Patent [19]

Semones et al.

[11] Patent Number: 4,504,755
[45] Date of Patent: Mar. 12, 1985

[54] ROTOR RELUCTANCE NOTCH FOR COGGING CONTROL

[75] Inventors: Burley C. Semones, Radford; Leon G. Reiss, Dublin, both of Va.

[73] Assignee: Kollmorgen Technologies Corporation, Dallas, Tex.

[21] Appl. No.: 548,333

[22] Filed: Nov. 3, 1983

[51] Int. Cl.³ ............................................ H02K 21/12
[52] U.S. Cl. ................. 310/156; 310/49 R; 310/217; 310/261
[58] Field of Search ............... 310/49, 156, 211, 212, 310/162, 163, 261, 262, 216–218, 42

[56] References Cited

U.S. PATENT DOCUMENTS

| | | | |
|---|---|---|---|
| 1,150,049 | 8/1915 | Martin | 310/217 X |
| 1,408,890 | 3/1922 | Kimble | 310/217 UX |
| 2,245,433 | 6/1941 | Delmonte | 310/42 UX |
| 2,432,436 | 12/1947 | Morrill | 310/156 |
| 3,083,311 | 3/1963 | Krasnow | 310/156 |
| 3,181,018 | 4/1965 | Shafranek et al. | 310/156 |
| 3,979,821 | 9/1976 | Noodleman | |

OTHER PUBLICATIONS

"Brushless Servomotors Use Notched Magnet to Stop Cogging", Electronic Design, Nov. 11, 1982, p. 38.

Primary Examiner—Mark O. Budd
Attorney, Agent, or Firm—Morgan, Finnegan, Pine, Foley & Lee

[57] ABSTRACT

In an electric motor of the type having a permanent magnet rotor which is subject to cogging torque, a plurality of skewed reluctance notches are cut in the outer diameter of the rotor laminations. The rotor laminations have first and second sets of axial openings which are filled respectively with rare earth magnet material and non-ferrous casting material.

4 Claims, 3 Drawing Figures

ROTOR RELUCTANCE NOTCH FOR COGGING
CONTROL

BACKGROUND OF THE INVENTION

The present invention relates generally to electric motors, and more specifically to rotors having high energy rare earth magnets. This invention controls cogging and ripple torque. It uses a rotor which eliminates loss of magnet material and permits use of a more easily wound stator.

U.S. Pat. No. 3,979,821, entitled "Method of Manufacturing Rare Earth Permanent Magnet Rotor", issued Sept. 14, 1976, discloses a rotor containing rare earth magnet material which can be assembled, machined and then magnetized. A stack of laminations is built up, pieces of virgin rare earth magnet material are inserted in the slots provided therefor in the laminations, the laminations with the rare earth magnet material are cast with aluminum, the cast rotor is machined and the rare earth magnet material is then magnetized.

Since the brushless motors of the type described in the above referenced patent typically include highly magnetic rare earth magnets, they are particularly sensitive to an objectionable cogging torque. Cogging torque is primarily caused by the magnetic attraction of stator teeth to uniform edges of concentrated magnetic positions on the surface of a rotor. Cogging causes variations in motor torque and speed and may prevent a motor from being used in precision servo applications. The conventional correction for this situation is to skew the stator one slot pitch for stators having an even number of slots or one half slot pitch for stators having an odd number of slots. However, in many cases it is difficult or impossible to properly insert the windings in the skewed slots.

An alternative solution to the problem of cogging is disclosed in an article entitled "Brushless Servomotors Use Notched Magnet to Stop Cogging," Electronic Design, Nov. 11, 1982. The alternative solution requires that a "V" shaped notch be cut into the magnet itself. Although this may be practical in some magnets, cutting a notch in a rare earth magnet is particularly difficult, since the magnets break easily during machining. Accordingly, there is a need for an arrangement which prevents cogging but which does not require skewed slots or notches in the magnets.

It is an object of the present invention to reduce cogging torque to a minimum in a motor having a permanent magnet rotor and wound stator.

It is another object of the present invention to reduce cogging without skewing the slot pitch of the stator and without cutting notches in the permanent magnets.

SUMMARY OF THE INVENTION

According to the present invention the cogging torque commonly associated with a brushless D.C. motor is eliminated by cutting a skewed reluctance notch in the outer diameter of a cylindrical stack of rotor laminations. The rotor is built up from a cylindrical stack of substantially circular laminations which have first and second sets of axial openings. Material for permanent rare earth magnets is placed in the first set of axial openings and a nonferrous casting material is poured into the second set of axial openings. Skewed reluctance notches are then cut at a relatively small angle with respect to the axis of the cylindrical stack of rotor laminations. The reluctance notches are cut in the outer diameter of the laminations above the permanent magnet material which can then be magnetized.

DETAILED DESCRIPTION OF THE INVENTION

Figure 1:
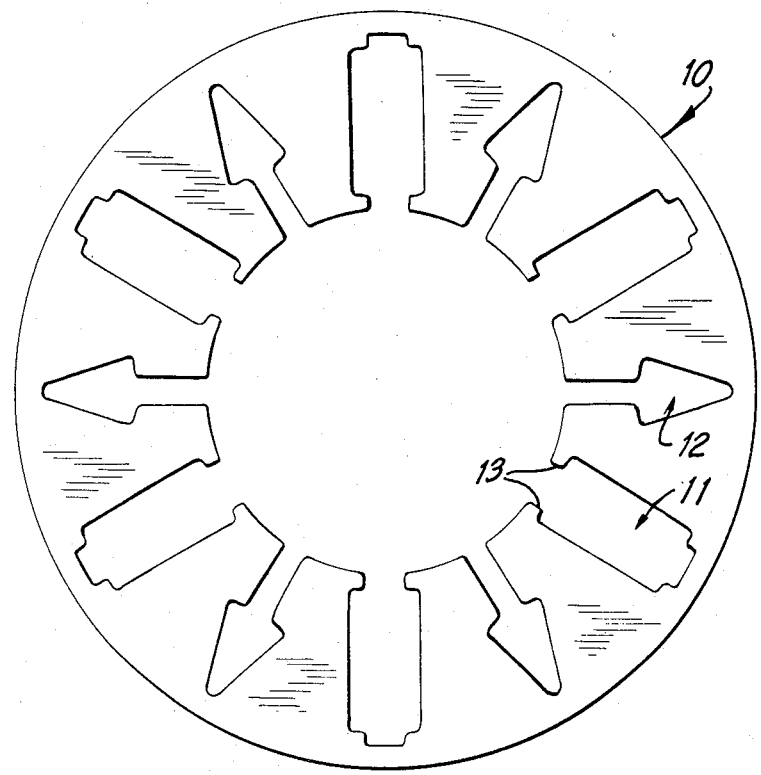
FIG. 1 is an illustration of a substantially circular rotor lamination having first and second sets of axial openings.

Referring now to FIG. 1 there is shown an illustration of a rotor lamination 10 preferably of electrical grade steel and about 0.02 inches thick. Lamination 10 has a first set of equally spaced openings 11 adapted to receive pieces of rare earth magnet material. Lamination 10 also has a second set of equally spaced openings 12 adapted to receive non-ferrous casting material, preferably molten aluminum, during a casting step. Each of the first set of openings 11 has lips or flanges 13 adapted to retain the pieces of rare earth magnet material.

In manufacturing the rare earth magnet rotor of the present invention a stack of laminations 10 of desired sizes for example 4 inches, is assembled in a mold. Next, the pieces of rare earth magnet material are inserted into the slots 11 to build up a column the height of the stack of the laminations. The pieces of rare earth magnet material are typically 0.5 inches by 0.8 inches by 1.3 inches so that, in the present illustrative embodiment 3 pieces of the rare earth magnet material would be required to fill each of the openings 11. The rare earth magnet material employed is preferably a cobalt-rare earth intermetallic compound, the preparation of such compounds and magnets therefrom being disclosed in Benz U.S. Pat. Nos. 3,655,463, 3,655,464, 3,695,945 and Benz et al U.S. Pat. No. 3,684,593. The rare earth magnet material for use in the present invention must be "virgin", i.e., it must be processed so as not to contain any significant magnetic field.

Figure 2:
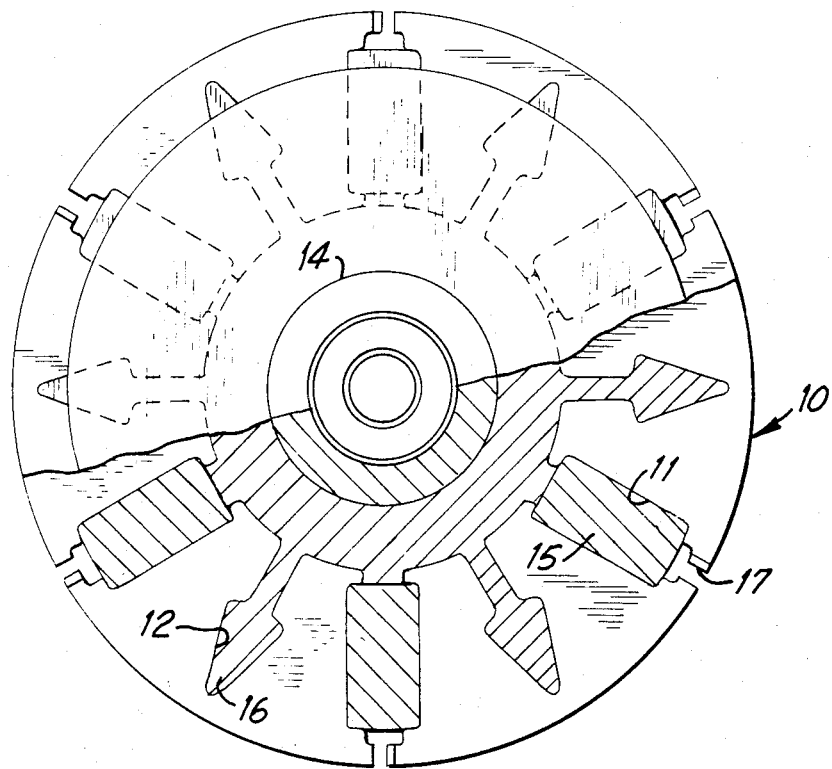
FIG. 2 is a partially cutaway end view of an assembled rotor.

Referring now to FIG. 2, a partially cut away end view of the assembled rotor having a shaft 14 is provided. After the laminations 10 and pieces of rare earth magnet material 15 have been stacked in the mold, the shaft 14 is preferably positioned at the center of the array, the longitudinal axis of the shaft being coincident with the longitudinal axis of the stack of laminations 10. The shaft 14 may be of ferrous material such as steel.

The assembly comprising the laminations 10, the pieces of virgin rare earth magnet material 15 and the rotor shaft 14 is now ready for casting using a non-ferrous material 16 preferably aluminum because of its light weight, low cost, high strength and high melting point. The molten aluminum 16 flows into the center section of the stack of laminations and into the second set of openings 12, thereby rendering the rotor structure rigid. It also locks the pieces of virgin rare earth magnet material 15 into the openings 11 and has the effect of reducing any retained residual magnetism possessed by the rare earth magnet material 15. Finally it makes the rotor shaft 14 an integral part of the motor structure. Once the rotor has been assembled a plurality of reluctance notches 17 can be cut in the outer diameter of the rotor laminations 10 directly above rare earth magnet material 15.

Figure 3:
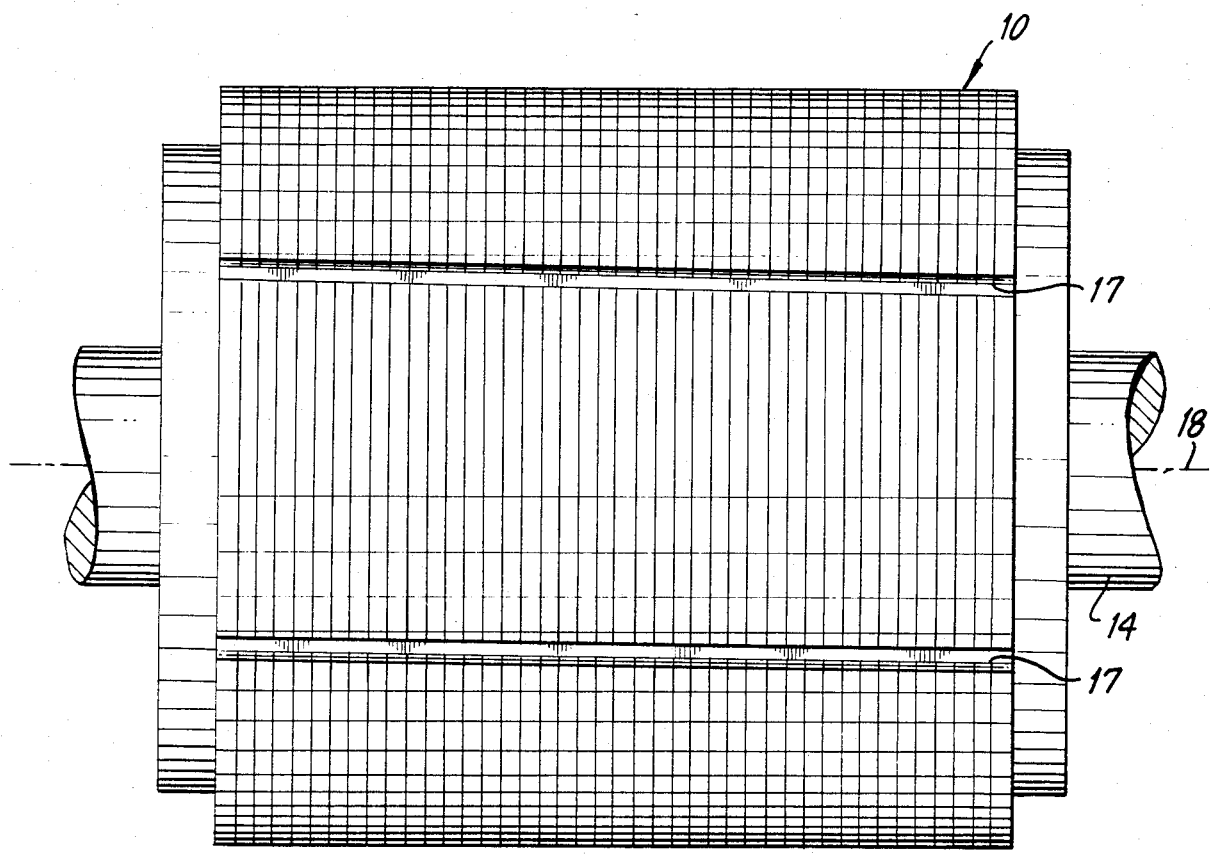
FIG. 3 is a side view of an assembled rotor.

Referring now to FIG. 3, there is a side view of the assembled rotor with reluctance notches 17 cut into the stack of rotor laminations 10. The reluctance notches 17 are approximately 0.375" in width and are skewed relative to the axis of the cylindrical stack of laminations 10. The axis of the cylindrical stack of laminations 10 is colinear with the centerline 18 of the shaft 14. Preferably, the reluctance notches 17 are skewed at a relatively small angle of approximately 1°–6° with respect to the axis of the cylindrical stack of laminations 10.

The cast rotor with the reluctance notches 17 and with the virgin rare earth magnet material is now ready for magnetization. This virgin rare earth magnet material can be saturated with between about 12,000 and about 18,000 oersteds to develop a field strength of between about 9,000 and 12,000 gauss. These low values may be employed because the rare earth magnet material is in a virgin state. The particular values selected depend on the type of rare earth magnet material used.

More specifically, the rotor of the present invention is used in a motor having a stator with no skewed slots. The rotor slot skew angle is equal to ½ stator slot pitch for stators having odd slots and one stator slot pitch for stators having even slots. Of course, a stator could be skewed a small angle and the rotor slot skew angle could be reduced to compensate for the stator slot skew.

While the invention has been described in its preferred embodiments it is to be understood that the words which have been used are words of description rather than limitation and that changes may be made within the purview of the appended claims without departing from the true scope and spirit of the invention in its broader aspects.

What is claimed is:

1. A rotor for an electric motor having a stator with substantially straight slots comprising:
   (a) a cylindrical stack of substantially circular ferrous laminations having,
      (i) at least a first set of axial openings; and
      (ii) a plurality of reluctance notches skewed with respect to the axis of the cylindrical stack and the substantially straight stator slots, the skewed reluctance notches being cut into outer periphery of said laminations and communicating with the first set of axial openings; and
   (b) a plurality of permanent rare earth magnets disposed in the first set of axial openings and cooperating with the skewed reluctance notches to provide a non-axial magnetic flux on the surface of the rotor for controlling cogging torque.

2. A rotor according to claim 1 which further includes a second set of axial openings and a non-ferrous casting material disposed within the second set of axial openings of said laminations.

3. A rotor according to claim 2 wherein the skewed reluctance notches are cut at an angle of approximately 1°–6° with respect to the axis of the cylindrical stack of said laminations, angle being nearly equal to half a stator slot pitch when the rotor is used with a stator having odd slots.

4. A rotor according to claim 2 wherein the skewed reluctance notches are cut at an angle of approximately 1°–6° with respect to the axis of the cylindrical stack of said laminations, the angle being nearly equal to one stator slot pitch when the rotor is used with a stator having even slots.

* * * * *